United States Patent
Miller et al.

(10) Patent No.: US 10,158,486 B1
(45) Date of Patent: Dec. 18, 2018

(54) SYNCHRONIZATION OF KEY MANAGEMENT SERVICES WITH CLOUD SERVICES

(71) Applicant: Cisco Technology, Inc., San Jose, CA (US)

(72) Inventors: Matthew A. Miller, Thornton, CO (US); Andrew Biggs, Thorton, CO (US); Bo Zou, Half Moon Bay, CA (US); Panos Kozanian, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 15/231,878

(22) Filed: Aug. 9, 2016

(51) Int. Cl.
*H04L 29/06* (2006.01)
*H04L 9/16* (2006.01)
*H04L 29/08* (2006.01)

(52) U.S. Cl.
CPC .............. *H04L 9/16* (2013.01); *H04L 63/062* (2013.01); *H04L 67/1095* (2013.01)

(58) Field of Classification Search
CPC . H04L 63/0442; H04L 63/062; H04L 9/0825; H04L 9/083; H04L 9/3234; H04L 9/16
USPC ........................................................ 713/150
See application file for complete search history.

(56) References Cited

U.S. PATENT DOCUMENTS

| | | | |
|---|---|---|---|
| 8,379,857 B1 | 2/2013 | Zheng | |
| 9,252,946 B2 | 2/2016 | Ranghuram et al. | |
| 9,350,536 B2 | 5/2016 | Sabin | |
| 2013/0312067 A1* | 11/2013 | Ogura | H04L 65/1069 726/4 |
| 2014/0089658 A1* | 3/2014 | Raghuram | H04L 9/0825 713/155 |
| 2014/0270178 A1 | 9/2014 | Kiang et al. | |
| 2015/0082031 A1* | 3/2015 | Ranghuram | H04L 9/0825 713/167 |
| 2015/0188927 A1 | 7/2015 | Santhi et al. | |
| 2015/0281184 A1 | 10/2015 | Cooley | |
| 2015/0281185 A1 | 10/2015 | Cooley | |
| 2016/0087946 A1* | 3/2016 | Yang | G06F 21/62 713/171 |
| 2017/0019385 A1* | 1/2017 | Yoo | H04L 63/061 |
| 2017/0078255 A1* | 3/2017 | Nejadian | H04L 63/0464 |

* cited by examiner

*Primary Examiner* — Samson B Lemma
(74) *Attorney, Agent, or Firm* — Edell, Shapiro & Finnan, LLC

(57) ABSTRACT

Presented herein are techniques for synchronizing a cloud service and a key management service via a single indirect synchronous message sent by a client device. In particular, a cloud service receives a service request message sent by a client device. Embedded into the service request message is an encrypted key management message. The cloud service is configured to extract the encrypted key management message from the service request message and then send the encrypted key management message to the key management service.

20 Claims, 6 Drawing Sheets

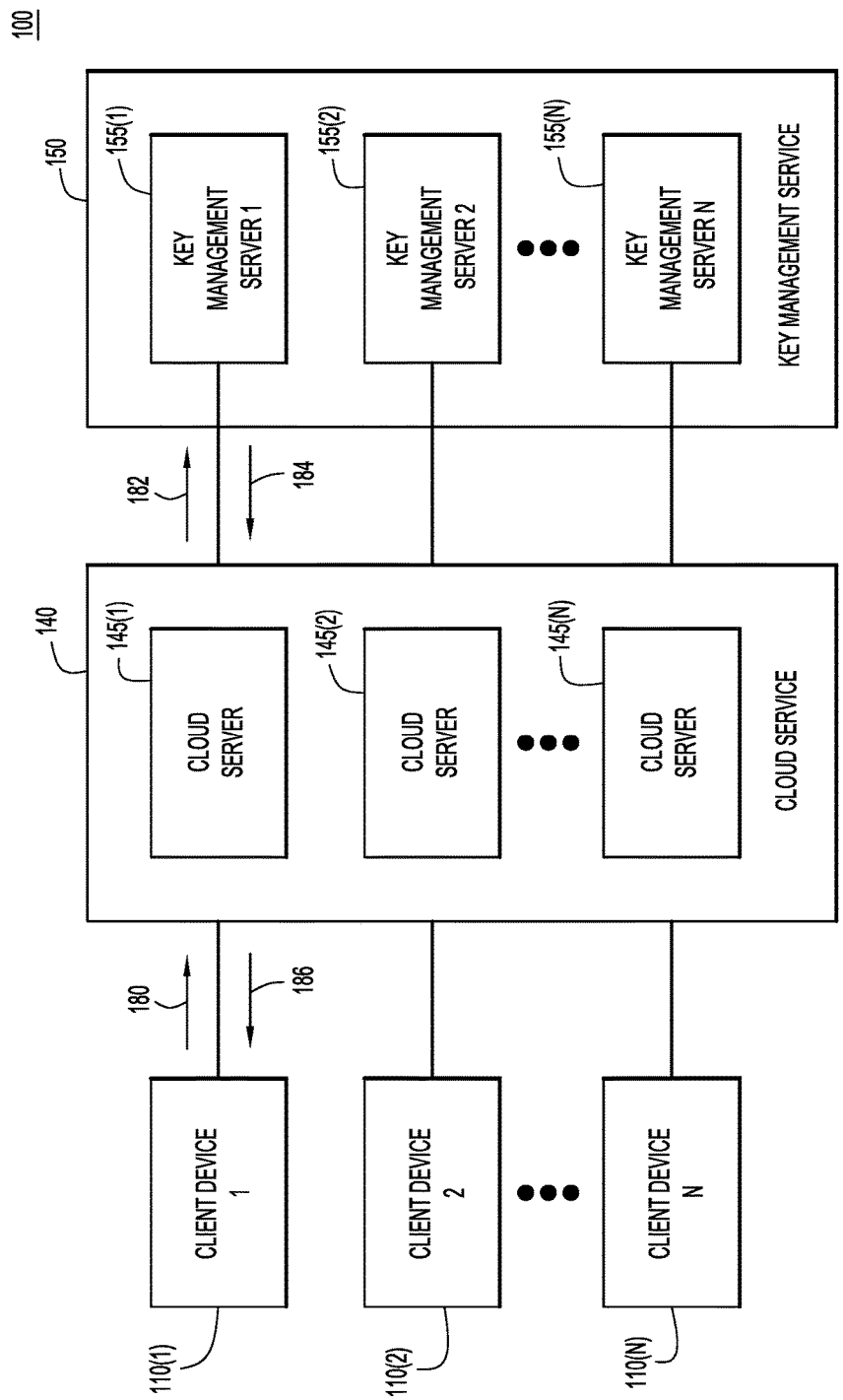

US 10,158,486 B1

SYNCHRONIZATION OF KEY MANAGEMENT SERVICES WITH CLOUD SERVICES

TECHNICAL FIELD

The present disclosure relates to synchronization of key management services with cloud services.

BACKGROUND

A web or cloud service is, in general, a service having associated resources that are made available over a network (e.g., the Internet). Cloud service resources may include, for example, Software as a Service (SaaS), Platform as a Service (PaaS), and Infrastructure as a Service (IaaS).

BRIEF DESCRIPTION OF THE DRAWINGS

FIG. 1 is a schematic block diagram of a segment of a cloud service system, according to an example embodiment.

DESCRIPTION OF EXAMPLE EMBODIMENTS

Overview

Figure 2A:
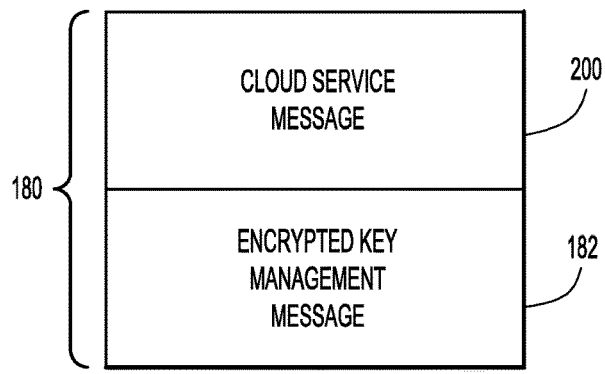
FIG. 2A is a schematic diagram of a service request message that includes an embedded encrypted key management message, according to an example embodiment.

Presented herein are techniques for synchronizing a cloud service and a key management service via a single indirect synchronous message sent by a client device. In particular, a cloud service receives a service request message sent by a client device. Embedded into the service request message is an encrypted key management message. The cloud service is configured to extract the encrypted key management message from the service request message and then send the encrypted key management message to the key management service.

Example Embodiments

FIG. 1 illustrates a segment 100 of a cloud service system configured to implement the techniques presented herein. In particular, shown in FIG. 1 are a plurality of client devices 110(1)-110(N), a web or cloud service 140 formed by a plurality of cloud servers 145(1)-145(N), and a key management service 150 formed by a plurality of key management servers 155(1)-155(N). In general, the client devices 110(1)-110(N), the cloud service 140, and the key management service 150 communicate with one another via one or more communication networks which, for ease of illustration, have been omitted from FIG. 1.

For ease of illustration, examples will generally be described with reference to communications between the clients 110(1)-110(N), the cloud service 140, and the key management service 150, and with reference to actions performed by the clients 110(1)-110(N), the cloud service 140, and the key management service 150. However, it is to be appreciated that communication with or by a "service," or actions performed by a "service," refer to communications with and/or actions performed by the devices (e.g., servers, networking devices, etc.) underlying/forming the service.

The cloud service 140 (e.g., the cloud servers 145(1)-145(N)) is configured to make resources available to the client devices 110(1)-110(N) over the communication network(s). In one example embodiment, the cloud service 140 may be a collaboration service configured to connect multiple users to achieve a common goal, such as sharing ideas, working on a project, and/or communicating with remote users (e.g., a chat room service, online meeting service, etc.).

Client devices 110(1)-110(N) may comprise any of a number of different types of computing devices including, without limitation, a personal computer (PC) device (e.g., desktop computer or laptop computer), a mobile computing device (e.g., mobile phones, note pads, tablets, personal data assistant (PDA) devices), etc. The key management servers 150(1)-150(N) are configured to provide cryptographic key services (e.g., key generation, exchanged, storage, etc.) for the cloud service 140. That is, the key management servers 150(1)-150(N) manage encryption keys that are used to encrypt data used by, or exchanged through, the cloud service 140. In certain examples, cryptographic keys are employed to encrypt communications between users of the cloud service 140 without the cloud service having access to the cryptographic keys (i.e., the cloud service is unable to decrypt the communications transferred through the service).

In conventional arrangements, when a key management service is used with a cloud service, particularly where an enterprise owns the keys of its entire user base, the client devices operated by the end users of the cloud service are required to perform several actions against both the key management service and the cloud service. For example, in conventional arrangements, when adding participants, removing participants, etc., client devices are required to separately update both the cloud service and the key management service. This separated and dual behavior is generally necessary to maintain the integrity of the cryptographic keys across the cloud service and the key management service, but also tends to result in synchronization issues (e.g., mismatched access to the keys, out-of-date key usage, etc.) that are difficult to correct. As such, presented herein are techniques to bind the key management operations to a similar operation in the cloud service by passing encrypted key management requests through the cloud service. That is, in accordance with the techniques presented, a client device sends an indirect synchronous message to the key management service via the cloud service. In response to the receipt of this indirect synchronous message routed through the cloud service, the key management service performs one or more operations and indicates basic success or failure of these operations to the cloud service. The cloud service then completes its corresponding one or more operations.

More specifically, as shown FIG. 1, the cloud service 140 is configured to receive a service request 180 from one of the client devices 110(1)-110(N). While FIG. 1 only illustrates the first client device 110(1) sending a service request 180 to the cloud service 140, it is to be appreciated that the cloud service 140 is configured to receive service requests 180 from any of the client devices 110(1)-110(N).

FIG. 2A is a schematic diagram illustrating the example content of a service request 180 in accordance with examples presented herein. As shown, the service request 180 comprises at least two portions, namely a cloud service message 200 and an encrypted key management message 182. Stated differently, an encrypted key management message 182 is embedded within the service request 180.

The cloud service message 200 is readable by the cloud service 140. However, due to the applied encryption, the cloud service 140 is unable to read the key management message 182. In accordance with the techniques presented herein, cloud service 140 is configured to extract the encrypted key management message 182 from the service request 180 and forward it to an appropriate key management server 155(1)-155(N) in the key management service 150. In certain examples, the service request 180 (e.g., the cloud service message 200) includes information or metadata indicating to the cloud service 140 a particular key management server 155(1)-155(N) to which the encrypted key management message 182 is to be sent. In certain examples, the encrypted key management message 182 may be encrypted with a key previously agreed upon between the client device 110(1) and the key management service 150.

The cloud service message 200 includes/indicates a request for the cloud service 140 to perform one or more operations. For example, if the cloud service 140 is a collaboration service, the cloud service 140 could be requested to create a collaboration room for users to join, to add a specific user to the collaboration room, remove a specific user from the collaboration room, etc. Similarly, the encrypted key management message 182 also includes/indicates a request for the key management service 150 to perform one or more operations that are associated with the operations requested of the cloud service 140. For example, if the cloud service message 200 includes a request to add a participant or user to a collaboration session, the encrypted key management message 182 may include a request that the key management service 150 authorize the participant or user to be added to the collaboration session.

Figure 2B:
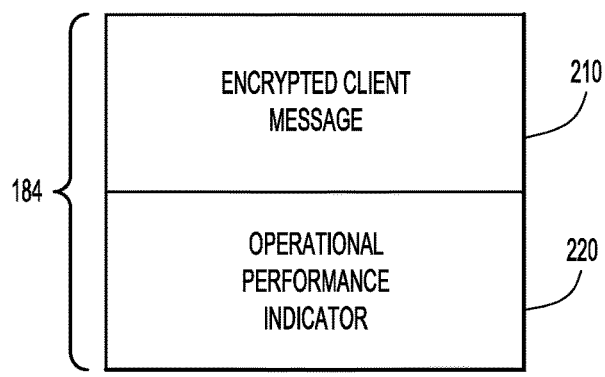
FIG. 2B is a schematic diagram of a key management server response message, according to an example embodiment.

After decrypting and performing one or more operations based on the encrypted key management message 182, the key management service 150 is configured to generate and send a key management response 184 back to the cloud service 140. FIG. 2B is a schematic diagram illustrating the content of an example key management response 184.

As illustrated in FIG. 2B, the key management response 184 comprises at least two portions, namely an encrypted client message 210 and an operational performance indicator 220. The encrypted client message 210 indicates to the client device 110(1) (i.e., the device that generated the original service request 180) the result of the one or more operations requested in the key management message 182 (e.g., whether or not the key management service 150 performed the requested operations). Similar to the encrypted key management message 182, the client message 210 may be encrypted with the key previously agreed upon between the client device 110(1) and the key management service 150. As such, the cloud service 140 is not capable of reading the client message 210.

However, as noted, the key management response 184 also includes the operational performance indicator 220 that is readable by the cloud service 140. The operational performance indicator 220 indicates to the cloud service 140 whether or not the key management service 150 performed the one or more operations requested by the client device 110(1) in the encrypted key management message 182. Thus, the cloud service 140 is configured to identify the operational performance indicator 220 in the key management response message 184, and once identified, determine the success or failure of the operations at the key management service 150.

The operational performance indicator 220 is used as a trigger by the cloud service 140 to either perform or reject the operations requested in the cloud service message 200. That is, the cloud service 140 only performs operations requested in the cloud service message 200 when the cloud service 140 receives, from the key management service 150, an indication that the key management service 150 performed the operations requested in the encrypted key management message 182. If the operational performance indicator 220 indicates that the key management service 150 did not perform the requested operations, then the cloud service 140 rejects (i.e., does not perform) the operations requested in the cloud service message 200.

Figure 2C:
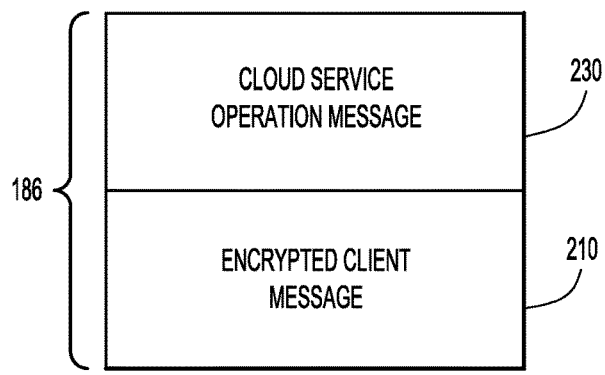
FIG. 2C is schematic diagram of a service response message, according to an example embodiment.

In response to receipt of the key management response 184, the cloud service is configured to send to the client device 110(1) a service response message 186. As illustrated in FIG. 2C, the service response message 186 includes a cloud service operation message 230 and the encrypted client message 210. The cloud service operation message 230 indicates to the client device 110(1) whether or not the cloud service performed the one or more operations requested in the cloud service message 200. As such, based on the cloud service operation message 230, the client device 110(1) can determine whether the cloud service 140 performed the requested operations. The client device 110(1) is also configured to decrypt the encrypted client message 210 and, as such, can determine whether the key management service 150 performed the operation requested in the key management message 182.

Figure 3:
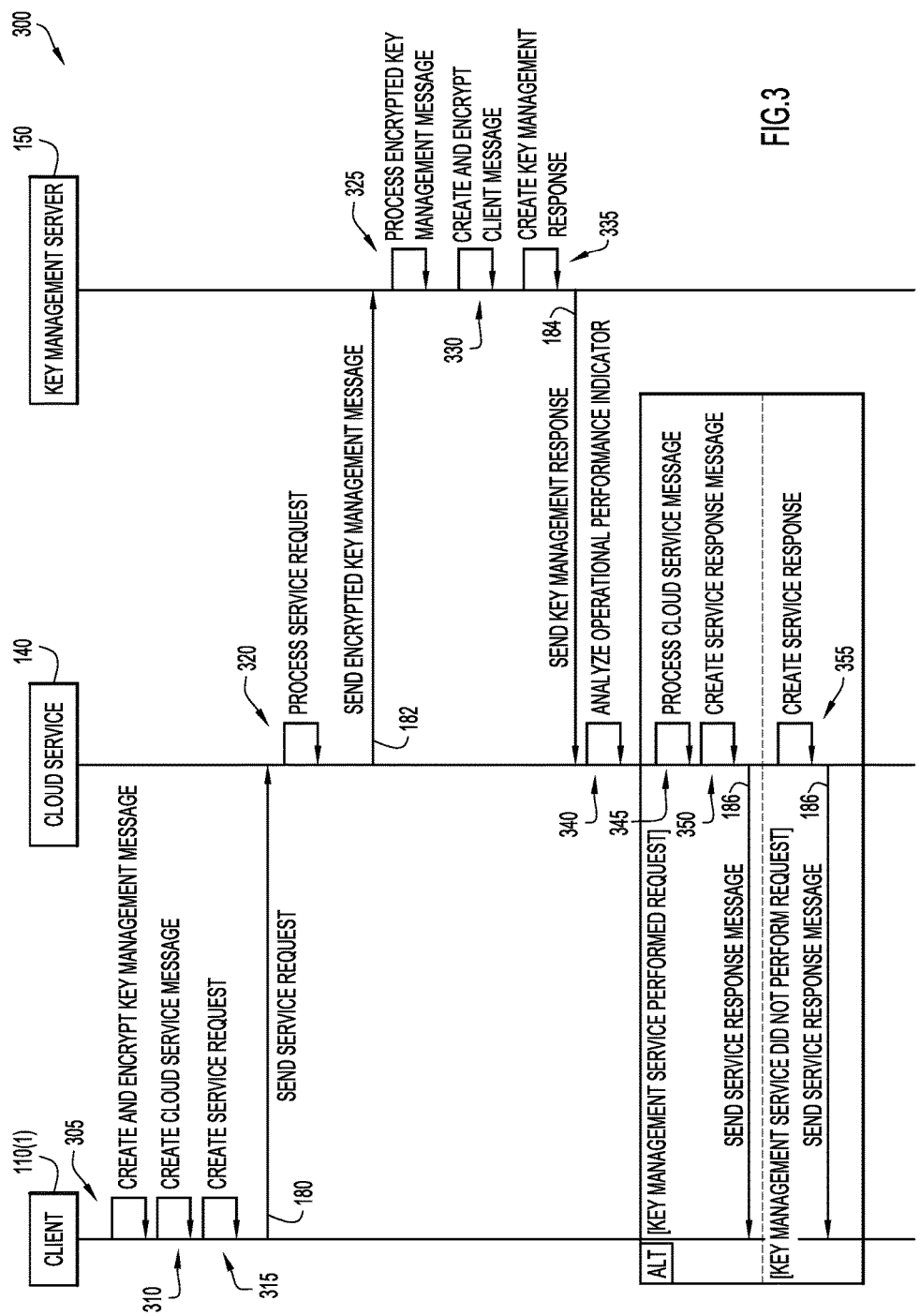
FIG. 3 is a ladder diagram depicting messages sent between, and operations performed by, various elements of a cloud service system, according to an example embodiment.

Illustrated in FIG. 3 is a ladder diagram 300 illustrating further details of the operations performed by the client device 110(1), the cloud service 140, and the key management service 150 in the example of FIG. 1. More specifically, at 305, the client device 110(1) creates the key management message 182 and then encrypts the key management message 182 (e.g., with a previously agreed upon key). At 310, the client device 110(1) creates the cloud service message 200. At 315, the client device 110(1) embeds the encrypted key management message 182 with the cloud service message 200 to create the service request 180. The client device 110(1) may embed the encrypted key management message 182 into a specific field within the service request 180. The service request 180 is then sent from the client device 110(1) to the cloud service 140.

At 320, the cloud service 140 processes the service request 180. In particular, the cloud service 140 inspects the service request 180 for any encrypted key management messages 182. Because the client device 110(1) may embed the encrypted key management message 182 into a specific field within the service request 180, the cloud service 140 may know where to look within the service request 180 for encrypted key management messages 182. Processing the service request 180 may further provide the cloud service 140 with information or metadata that indicates a particular key management server 155(1)-155(N) to which the encrypted key management message 182 is to be sent.

When the inspection of service request 180 by the cloud service 140 reveals the presence of an encrypted key management message 182, the cloud service 140 temporarily pauses (i.e., does not immediately perform) the operations requested in the cloud service message 200. The cloud service 140 then extracts and sends the encrypted key management message 182 to the appropriate key management server 155(1), 155(2), 155(N) of the key management service 150.

At 325, the key management service 150 decrypts and processes the received encrypted key management message 182. The key management service 150 may then either perform or reject the operations requested in the encrypted key management message 182. In one form, the key management service 150 is configured to updates an access control list (ACL) associated with the cloud service 140 based on the key management message 182. At 330, the key management service 150 generates and encrypts the client message 210 (e.g., with a previously agreed upon key).

At 335, the key management service 150 embeds an operational performance indicator 220 with the encrypted client message 210 to create the key management response 184. The key management service 150 then sends the key management response 184 to the cloud service 140.

At 340, upon receipt of the key management response 184, the cloud service 140 analyzes the operational performance indicator 220 to determine whether or not the key management service 150 performed the one or more requested operations included in the encrypted key management message 182. In the event that the key management service 150 did perform the requested operations, at 345, the cloud service 140 performs the operations of the cloud service message 200. Again, in one form, these operations may include updating an ACL such that the ACL of the cloud service 140 is synchronized with the ACL in the key management service. This ensures that the key management service 150 and the cloud service 140 contain the same ACL information, which mitigates inconsistencies between the key management service 150 and the cloud service 140.

At 350, the cloud service 140 generates the cloud service operation message 230 and embeds it with the encrypted client message 210 to create the service response message 186. The cloud service 140 then sends this service response message 186 to the client device 110(1). In this case, the service response message 186 indicates that both the cloud service 140 and the key management service 150 performed their requested operations.

However, returning to 340, the cloud service 140 may determine that the key management service 150 did not performed the requested operations of the encrypted key management message 182. As a result, the cloud service 140 does not perform the operations requested in the cloud service message 200. Instead, at 355, the cloud service 140 generates and embeds the cloud service operation message 230 with the encrypted client message 210 to create the service response message 186. The cloud service 140 then sends this service response message 186 to the client device 110(1). In this case, the service response message 186 indicates that neither the cloud service 140 nor the key management service 150 performed their requested operations.

The process outlined above with respect to FIG. 3 uses an indirect synchronous flow between the cloud service 140 and the key management service 150 to provide synchronization for the services. In other words, the cloud service 140 only performs the requested operation of the cloud service message 200 when the cloud service 140 receives, from the key management service 150 an indication that the key management service 150 performed the requested operation of the encrypted key management message 182 that accompanied the cloud service message 200. The cloud service 140 is unable to perform the requested operation of the cloud service message 200 if the key management service 150 returns operational performance indicators 220 that indicate the key management service 150 did not perform the requested operation of the encrypted key management message 182 that accompanied the cloud service message 200.

Figure 4:
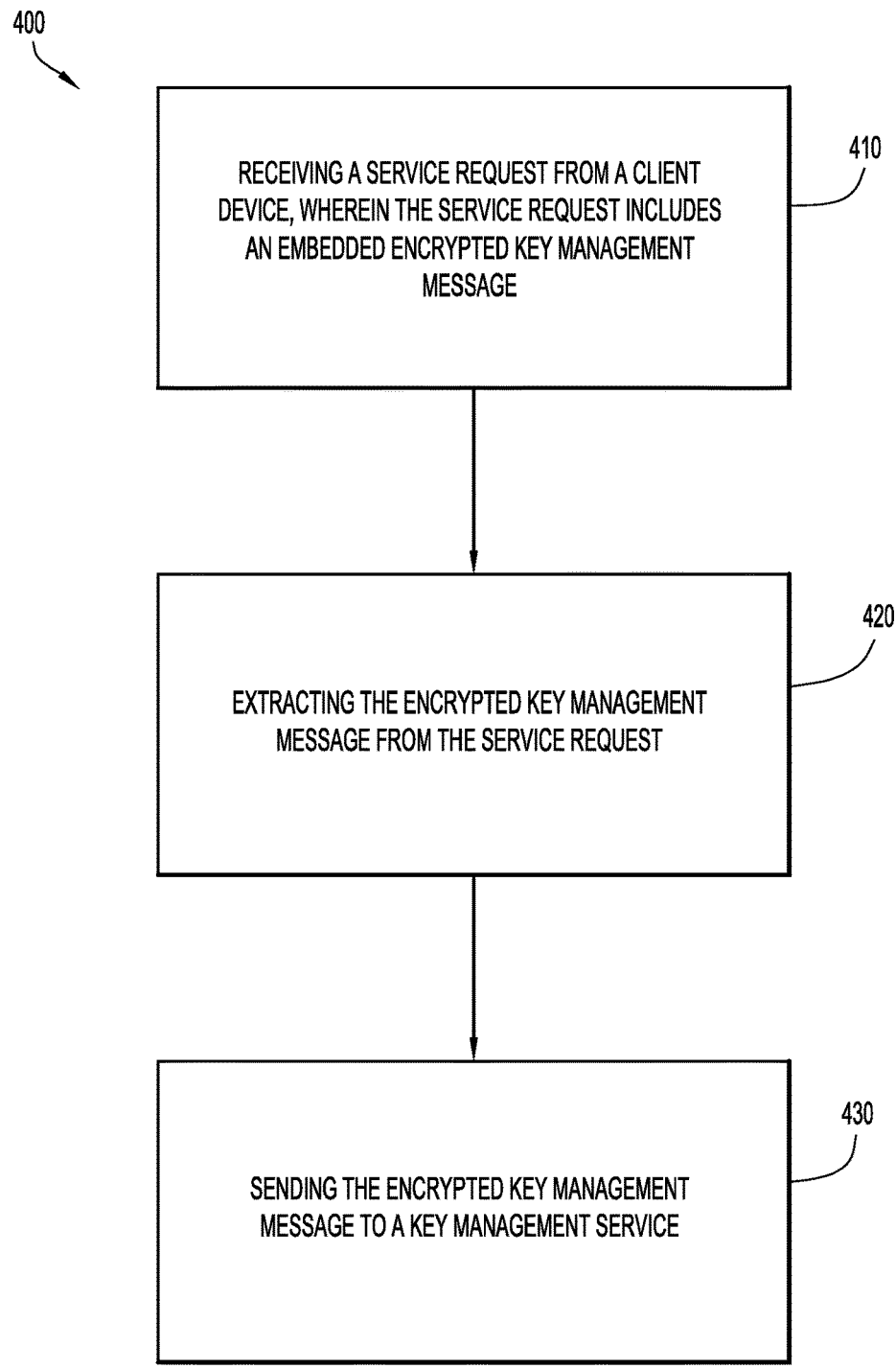
FIG. 4 is a flowchart depicting a method, according to an example embodiment.

An example embodiment of a process 400 performed by the cloud service 140 is depicted by the flowchart of FIG. 4. Reference is also made to FIGS. 1, 2A, 2B, 2C, and 3, for purposes of the description of FIG. 4. At 410, the cloud service 140 receives from a client device 110(1) a service request 180. As best illustrated in FIG. 2A, embedded within the service request 180 is an encrypted key management message 182. The cloud service 140 is unable to read the encrypted key management message 182 because the cloud service 140 does not have the encryption key agreed upon by the client device 110(1) and the key management service 150. At 420, the cloud service 140 may then extract the encrypted key management message 182 from the service request 180. At 430, the cloud service 140 sends the encrypted key management message 182 to the key management service 150. In the event that the key management service 150 contains multiple key management servers 155(1), 155(2), 155(N), as depicted in the cloud service system segment 100 depicted in FIG. 1, the service request 180 may contain data or information as to which key management server 155(1), 155(2), 155(N) to send the encrypted key management message 182.

Figure 5:
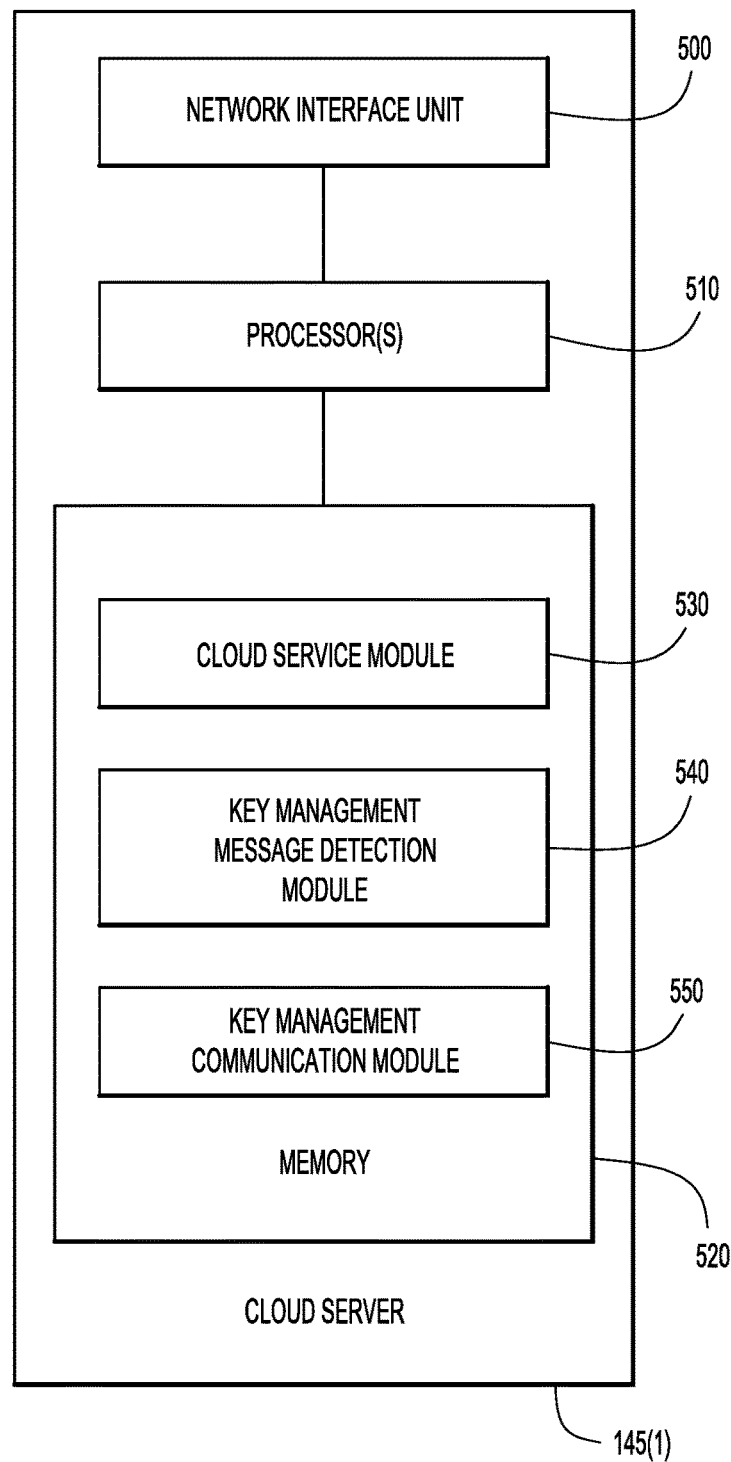
FIG. 5 is a block diagram of a cloud server, according to an example embodiment.

Illustrated in FIG. 5 is an example block diagram of an example cloud server, such as cloud server 145(1), forming part of cloud service 140. While only the cloud server 145(1) is illustrated in FIG. 5, it is to be appreciated that the other cloud server 145(2)-145(N) of the cloud service 140 may have similar arrangements.

As shown, the cloud server 145(1) includes a network interface unit 500, one or more processor(s) 510, and a memory 520. The network interface unit 500 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 500 may include a wireless network interface unit to facilitate wireless communication over networks.

The processor(s) 510 may be embodied by one or more microprocessors or microcontrollers, and execute software instructions stored in memory 520 for the cloud service module 530, key management message detection module 540, and key management communication module 550 in accordance with the techniques presented herein in connection with FIGS. 1, 2A, 2B, 2C, 3, and 4.

Memory 520 may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 520 may comprise one or more tangible (e.g., non-transitory) computer readable storage media (e.g., a memory device) encoded with software comprising computer executable instructions, and when the software is executed by the processor(s) 510, the processor(s) 510 are operable to perform the operations described herein by executing instructions associated with the cloud service module 530, key management message detection module 540, and key management communication module 550. In other approaches, the cloud service module 530, key management message detection module 540, and key management communication module 550 may be stored remotely, external to the cloud service 140, but accessible by the processor(s) 510. The cloud service module 530 enables the cloud server 145(1) to provide services or resources to one or more of the client devices 110(1), 110(2), 110(N) via a network. As previously explained, in one example embodiment, the cloud service 140 formed by the cloud server 145(1) (and possibly other servers) may be a collaboration service configured to connect multiple users to achieve a common goal, such as sharing ideas, working on a project, and/or communicating with remote users.

The key management message detection module 540 enables the cloud server 145(1) to inspect incoming or received service requests 180 for an embedded encrypted key management message 182. The key management server message detection module 540 enables the cloud server 145(1) to look to the specific field of the received service request 180 to determine if the service request 180 includes encrypted key management messages 182. The detection of an encrypted key management message 182 ultimately dictates the performance of cloud server 145(1). The key management message detection module 540 may further enable the cloud service 140 to extract detected key management messages 182 from the received service requests 180.

The key management communication module 550 enables the cloud server 145(1) to send messages to and receive messages from key management service 150. In the event that the cloud server 145(1) detects and extracts an encrypted key management message 182 from the service request 180 via the key management server message detection module 540, the key management communication module 550 enables the cloud server 145(1) to send the extracted encrypted key management message 182 to the appropriate key management server 155(1), 155(2), 155(N) of the key management service 150. In addition, the key management communication module 550 enables the cloud server 145(1) to receive any response messages 184 from the key management service 150.

The functions of the processor(s) 510 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

Figure 6:
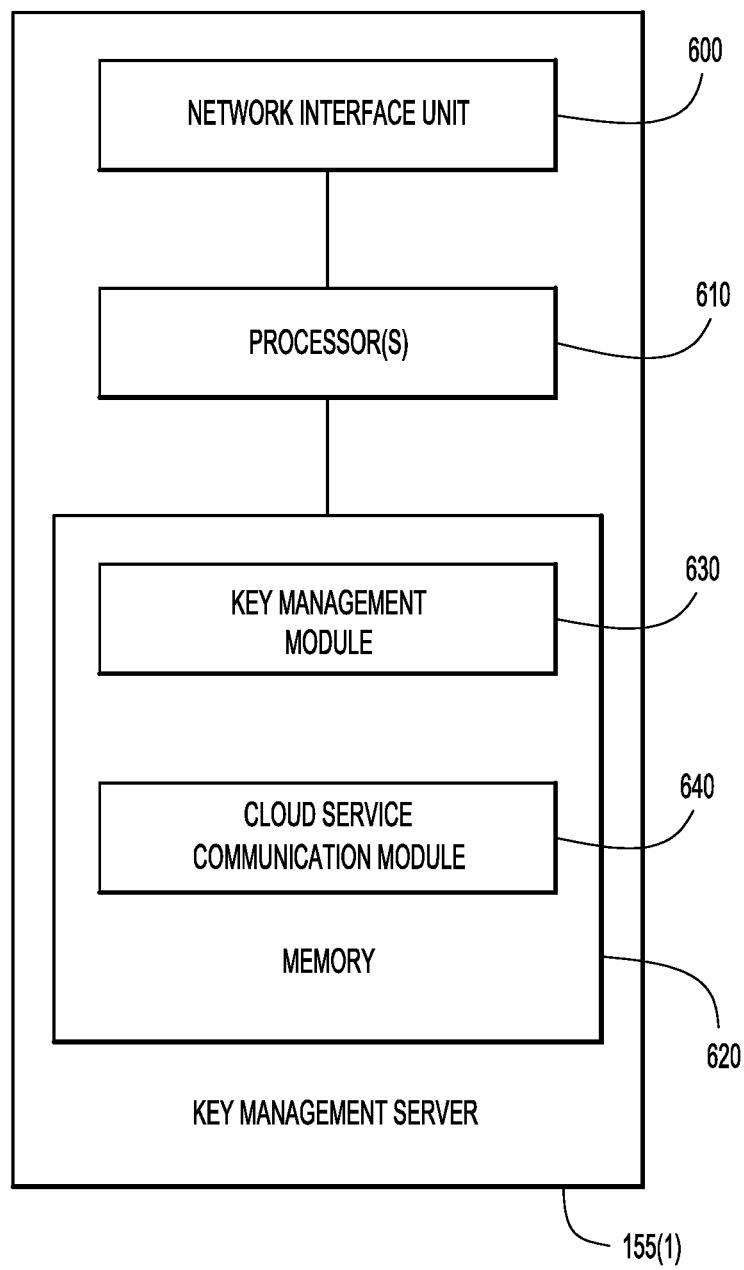
FIG. 6 is a block diagram of a key management server, according to an example embodiment.

Illustrated in FIG. 6 is an example block diagram of an example key management server, such as the key management server 155(1) forming key management service 150. While only the key management server 155(1) is illustrated in FIG. 6, other key management servers 155(2)-155(N) of the key management service 150 may have similar arrangements. Thus, the discussion of FIG. 6 may also apply to the other key management servers 155(2), 155(N). The key management server 155(1) may be configured to perform the techniques presented herein. The key management server 155(1) includes a network interface unit 600, one or more processor(s) 610, and a memory 620. Similar to the network interface unit 500 of the cloud service 140, the network interface unit 600 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 600 may include a wireless network interface unit to facilitate wireless communication over networks, as illustrated in FIG. 1.

The processor(s) 610, similar to the processor(s) 510 of the cloud service 140, may be embodied by one or more microprocessors or microcontrollers, and executes software instructions stored in memory 620 for the key management module 630 and the cloud service communication module 640 in accordance with the techniques presented herein in connection with FIGS. 1, 2A, 2B, 2C, 3, and 4.

Memory 620, similar to memory 520 of the cloud service 140, may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 620 may comprise one or more tangible (e.g., non-transitory) computer readable storage media (e.g., a memory device) encoded with software comprising computer executable instructions, and when the software is executed by the processor(s) 610, the processor(s) 610 is operable to perform the operations described herein by executing instructions associated with the key management module 630 and the cloud service communication module 640. In other approaches, and as previously described, the key management module 630 and the cloud service communication module 640 are stored remotely, external to the key management server 155(1), but accessible by the processor(s) 610. The key management module 630 enables the key management server 155(1) to provide the generation, exchange, storage, use, and replacement of keys of a cryptosystem or security service. The key management module 630 enables the client devices 110(1), 110(2), 110(N) and the key management server 155(1) to determine cryptographic keys with which the client devices 110(1), 110(2), 110(N) encrypt the key management messages 182. Furthermore, the key management module 630 also enables the key management server 155(1) to decrypt any received encrypted key management messages 182 and to encrypt the client messages 210.

The cloud service communication module 640 enables the key management server 155(1) to receive messages from and send messages to the cloud service 140. Thus, the key cloud service communication module 640 enables the key management server 155(1) to receive the encrypted key management messages 182 originated by the client devices 110(1), 110(2), 110(N) from the cloud service 140. Furthermore, the cloud service communication module 640 enables the key management server 155(1) to send to the cloud service 140 key management response 184. The cloud service communication module 640 enables the key management server 155(1) to include both the encrypted client message 210, that can only be read by the intended client device 110(1), 110(2), 110(N), and the operational performance indicator 220, that is configured to instruct the cloud service 140 on whether or not the key management server 155(1) performed the requested one or more operations in the encrypted key management message 182 from the client devices 110(1), 110(2), 110(N).

The functions of the processor(s) 610 may be implemented by logic encoded in one or more tangible computer readable storage media or devices (e.g., storage devices compact discs, digital video discs, flash memory drives, etc.

and embedded logic such as an ASIC, digital signal processor instructions, software that is executed by a processor, etc.).

While FIG. 6 shows that the key management server 155(1) may be embodied as a dedicated physical device, it should be understood that the functions of the key management server 155(1) may be embodied as software running in a data center/cloud computing system, together with numerous other software applications.

The techniques presented herein provide a computer-implemented method of re-routing an encrypted portion of a service request to a cloud service to another server. The cloud service receives, from a client device, a service request, where the service request includes an embedded encrypted key management message. The cloud service, upon receiving the service request, extracts the encrypted key management message from the service request. After extracting the encrypted key management message, the cloud service then sends the extracted encrypted key management message to a key management service.

In another form, an apparatus is provided comprising a network interface unit configured to network communications, including communication with a plurality of client devices and a key management service; a memory; and a processor configured to: receive a service request from a client device, wherein the service request includes an embedded encrypted key management message; extract the encrypted key management message from the service request; and send the encrypted key management message to a key management service.

In still another form, one or more non-transitory computer readable storage media are provided for a server in communication with a plurality of client devices and a plurality of key management servers, the computer readable storage media being encoded with software comprising computer executable instructions, and when the software is executed, operable to: receive a service request from a client device, wherein the service request includes an embedded encrypted key management message; extract the encrypted key management message from the service request; and send the encrypted key management message to a key management service.

The above description is intended by way of example only. Various modifications and structural changes may be made therein without departing from the scope of the concepts described herein and within the scope and range of equivalents of the claims.

What is claimed is:

1. A method comprising:
    receiving, at a collaboration cloud service, a service request from a client device, wherein the service request includes an embedded encrypted key management message and a cloud service message that indicates a request for the collaboration cloud service to perform one or more collaboration service operations;
    extracting the encrypted key management message from the service request;
    sending the encrypted key management message to a key management service, the encrypted key management message configured to trigger the key management service to perform one or more key management service operations; and
    receiving a key management response from the key management service, wherein the key management response includes an encrypted client message directed to the client device and information readable by the collaboration cloud service that indicates a result of one or more key management service operations, wherein the collaboration cloud service and the key management service are implemented using at least one hardware processor.

2. The method of claim 1, wherein the key management service comprises a plurality of key management servers, and wherein the method further comprises:
    identifying, from information in the service request, a key management server to which the encrypted key management message is to be sent.

3. The method of claim 1, wherein the cloud service message is configured to trigger the collaboration cloud service to perform the one or more collaboration service operations, and wherein the method further comprises:
    delaying performance of the one or more collaboration service operations by the cloud service until receipt of the key management response.

4. The method of claim 3, wherein the key management response indicates that the key management service performed the one or more operations associated with the key management response, and wherein the method further comprises:
    performing the one or more collaboration service operations associated with the cloud service message received from the client device; and
    forwarding the encrypted client message to the client device.

5. The method of claim 3, wherein the key management response indicates that the key management service did not perform the one or more operations associated with the key management request, and wherein the method further comprises:
    terminating the previously delayed one or more collaboration service operations associated with the cloud service message; and
    forwarding the encrypted client message to the client device.

6. The method of claim 1, wherein the encrypted key management message is encrypted by the client device using a key pre-negotiated between the client device and the key management service.

7. The method of claim 1, wherein the encrypted client message is encrypted by the key management service using a key pre-negotiated between the client device and the key management service.

8. An apparatus comprising:
    a network interface unit configured to enable network communications; and
    a hardware processor configured to:
        receive, at a collaboration cloud service, a service request from a client device, wherein the service request includes an embedded encrypted key management message and a cloud service message that indicates a request for the collaboration cloud service to perform one or more collaboration service operations;
        extract the encrypted key management message from the service request;
        send the encrypted key management message to a key management service, the encrypted key management message configured to trigger the key management service to perform one or more key management service operations; and
        receive a key management response from the key management service, wherein the key management response includes an encrypted client message directed to the client device and information readable by the collaboration cloud service that indicates a result of one or more key management service operations.

9. The apparatus of claim 8, wherein the key management service comprises a plurality of key management servers, and wherein the processor is further configured to:
  identify, from information in the service request, a key management server to which the encrypted key management message is to be sent.

10. The apparatus of claim 8, wherein the service request is configured to trigger the collaboration cloud service to perform the one or more collaboration service operations, and wherein the processor is configured to:
  delay performance of the one or more collaboration service operations by the collaboration cloud service until receipt of the key management response.

11. The apparatus of claim 10, wherein the key management response indicates that the key management service performed the one or more operations associated with the encrypted key management message, and wherein the processor is configured to:
  perform the one or more collaboration service operations associated with the cloud service message from the client device; and
  forward the encrypted client message to the client device.

12. The apparatus of claim 10, wherein the key management response indicates that the key management service did not perform the one or more operations associated with the encrypted key management message, and wherein the processor is configured to:
  terminate the previously delayed one or more collaboration service operations associated with the cloud service message; and
  forward the encrypted client message to the client device.

13. The apparatus of claim 8, wherein the encrypted key management message is encrypted by the client device using a key pre-negotiated between the client device and the key management service.

14. The apparatus of claim 8, wherein the encrypted client message is encrypted by the key management service using a key pre-negotiated between the client device and the key management service.

15. One or more non-transitory computer readable storage media of a server in communication with clients, the computer readable storage media being encoded with software comprising computer executable instructions, and when the software is executed, operable to:
  receive, at a collaboration cloud service, a service request from a client device, wherein the service request includes an embedded encrypted key management message and a cloud service message that indicates a request for the collaboration cloud service to perform one or more collaboration service operations;
  extract the encrypted key management message from the service request;
  send the encrypted key management message to a key management service, the encrypted key management message configured to trigger the key management service to perform one or more key management service operations; and
  receive a key management response from the key management service, wherein the key management response includes an encrypted client message directed to the client device and information readable by the collaboration cloud service that indicates a result of one or more key management service operations, wherein the collaboration cloud service and the key management service are implemented using at least one hardware processor.

16. The non-transitory computer readable storage media of claim 15, wherein the key management service comprises a plurality of key management servers, and further comprising instructions operable to:
  identify, from information in the service request, a key management server to which the encrypted key management message is to be sent.

17. The non-transitory computer readable storage media of claim 15, wherein the service request is configured to trigger the collaboration cloud service to perform the one or more collaboration service operations, and further comprising instructions operable to:
  delay performance of the one or more collaboration service operations by the collaboration cloud service until receipt of the key management response.

18. The non-transitory computer readable storage media of claim 17, wherein the key management response indicates that the key management service performed the one or more operations associated with the encrypted key management message, and further comprising instructions operable to:
  perform the one or more collaboration service operations associated with the cloud service message from the client device; and
  forward the encrypted client message to the client device.

19. The non-transitory computer readable storage media of claim 17, wherein the key management response indicates that the key management service did not perform the one or more operations associated with the encrypted key management message, and further comprising instructions operable to:
  terminate the previously delayed one or more collaboration service operations associated with the cloud service message; and
  forward the encrypted client message to the client device.

20. The non-transitory computer readable storage media of claim 15, wherein the encrypted client message is encrypted by the key management service using a key pre-negotiated between the client device and the key management service.

* * * * *